Figure 1:
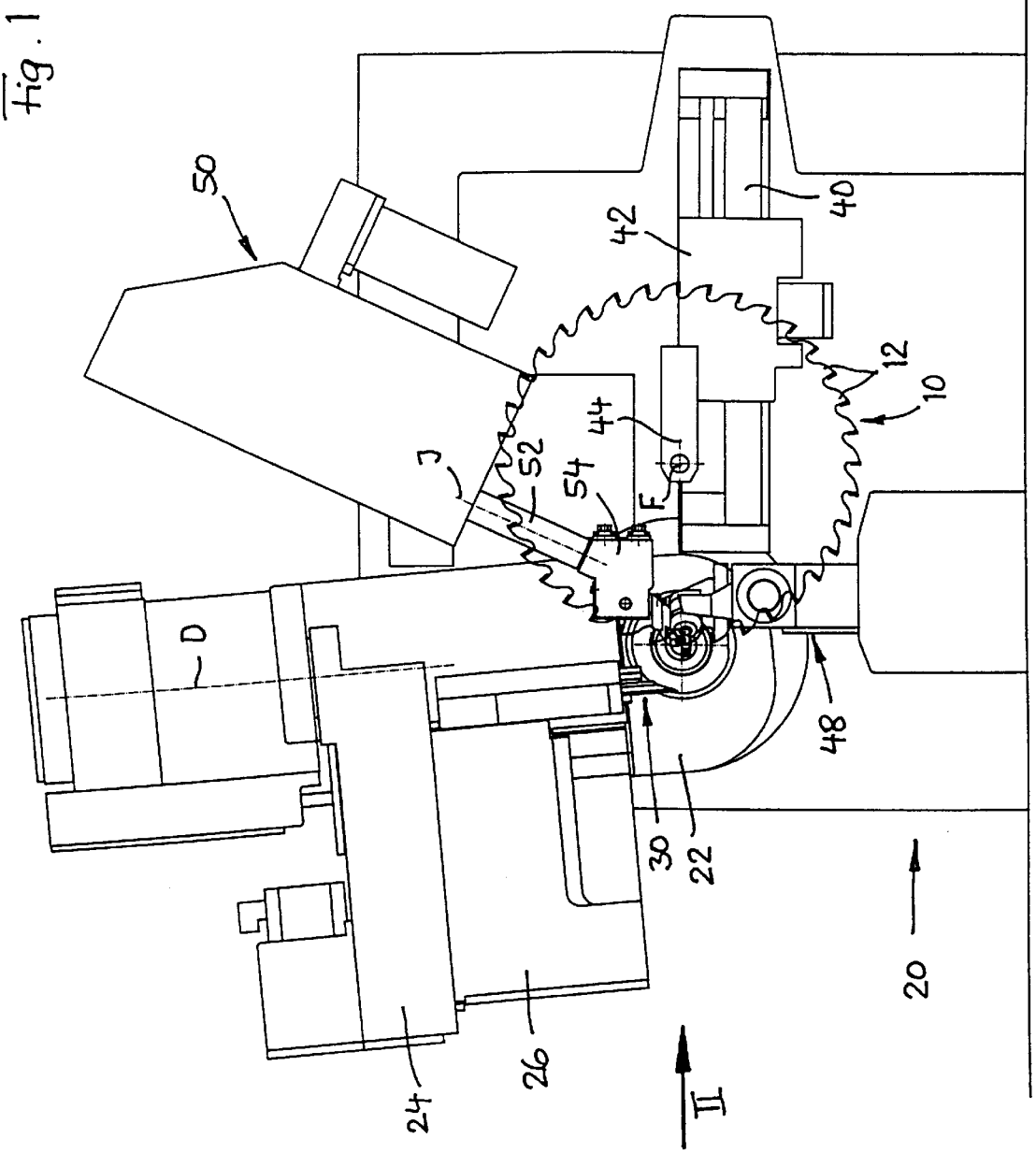

United States Patent
Lenard et al.

[19]

[11] Patent Number: 6,109,137
[45] Date of Patent: Aug. 29, 2000

[54] MACHINE FOR MACHINING WORKPIECES WITH CUTTING TEETH, IN PARTICULAR SAW BLADES

[75] Inventors: Peter Lenard, Biberach; Norbert Bailer, Schemmerhofen-Altheim; Rudi Schmucker, Warthausen, all of Germany

[73] Assignee: Vollmer Werke Maschinenfabrik GmbH, Biberach/Riss, Germany

[21] Appl. No.: 09/180,336

[22] PCT Filed: Jul. 21, 1997

[86] PCT No.: PCT/EP97/03904

§ 371 Date: Nov. 5, 1998

§ 102(e) Date: Nov. 5, 1998

[87] PCT Pub. No.: WO98/04379

PCT Pub. Date: Feb. 5, 1998

[30] Foreign Application Priority Data

Jul. 25, 1996 [DE] Germany .................. 196 30 057

[51] Int. Cl.⁷ .................................................. B23D 63/14
[52] U.S. Cl. .................. 76/37; 76/41; 76/43; 76/48; 76/77; 451/9; 451/65
[58] Field of Search .................. 76/41, 43, 37, 76/48, 50, 77, 45; 451/5, 9, 65

[56] References Cited

U.S. PATENT DOCUMENTS

| | | | |
|---|---|---|---|
| 4,357,841 | 11/1982 | More | 26/77 |
| 4,483,218 | 11/1984 | Beck et al. | |
| 4,488,458 | 12/1984 | Beck et al. | |
| 4,587,867 | 5/1986 | Pokorney et al. | |
| 5,184,428 | 2/1993 | Feldi et al. | 451/9 |

FOREIGN PATENT DOCUMENTS

| | | |
|---|---|---|
| 2531649A | 2/1984 | France . |
| 2531889A | 2/1984 | France . |
| 3314601A1 | 10/1984 | Germany . |
| 4316789A1 | 11/1994 | Germany . |
| 19518710C | 11/1996 | Germany . |
| 2099338A | 12/1982 | United Kingdom . |

OTHER PUBLICATIONS

VOLLMER CHD, Die Automaten zum Schleifen der Kompletten Zahngeometrie, Oct. 1995, Germany.

*Primary Examiner*—Douglas D. Watts
*Attorney, Agent, or Firm*—Clifford W. Browning; Woodard, Emhardt, Naughton Moriarty & McNett

[57] ABSTRACT

A pivot body (22) mounted on a machine bed (20) so as to be capable of swinging defines a lift axis (D) which extends transversely of its own pivot axis (A) and along which a reciprocating slide (24) is movable. Infeed of a saddle (26) on the reciprocating slide (24) can be effected along a spindle axis (E) transversely of the lift axis (D). A tool spindle (28) adapted to receive a tool (30) is supported on the saddle (26) so as to be driven in rotation about the spindle axis (E). Furthermore, a workpiece slide (42) is guided for traversing movement on the machine bed (20) and, together with a workpiece support (44), it defines a central plane (G) extending at right angles to the pivot axis (A). An advance finger (58) is adapted to be engaged intermittently with a respective one of the cutting teeth (12) of a workpiece (10) in order to advance the same. A common feeler (70) for determining the distance of the cutting teeth (12) from the workpiece support (44) as well as determining a measurable variable which reflects the condition of wear of the tool (30) or the advance finger (58) is movable from an inactive position into a measuring position near point (H) at which the pivot axis (A) passes through the central plane (G). The measured data are converted into signals for controlling the workpiece slide (42) and the saddle (26) and/or the advance means (50).

7 Claims, 12 Drawing Sheets

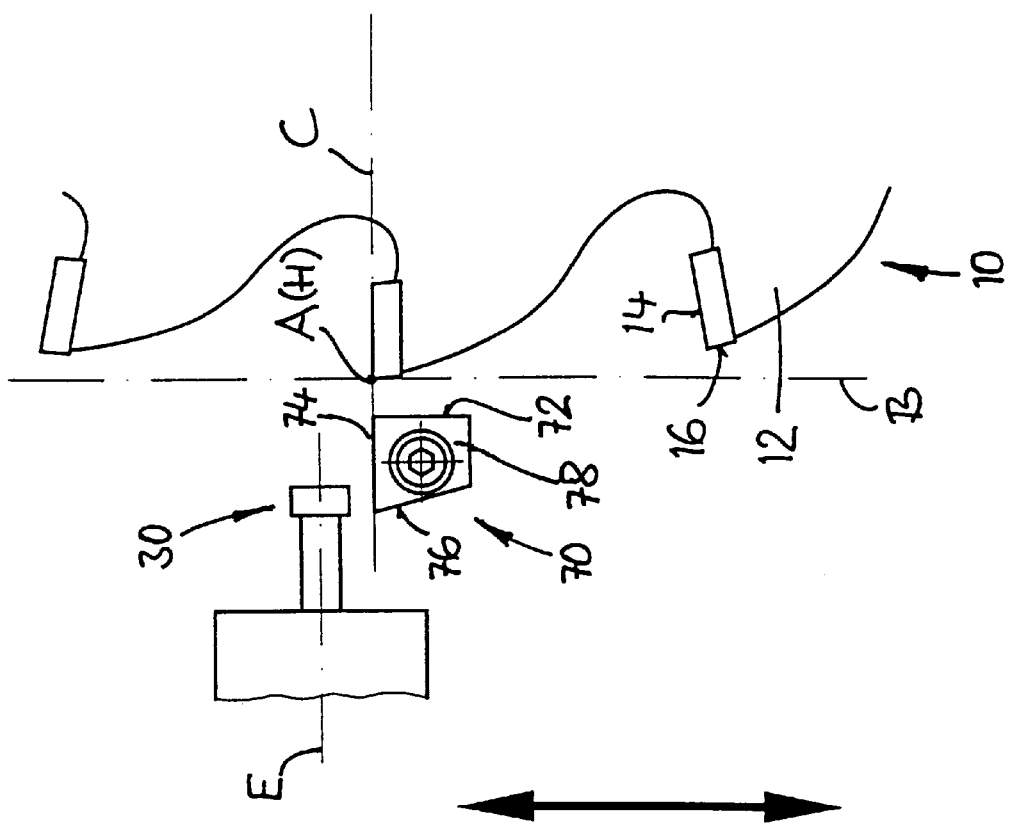

MACHINE FOR MACHINING WORKPIECES WITH CUTTING TEETH, IN PARTICULAR SAW BLADES

The invention relates to a machine for machining workpieces which have cutting teeth, especially saw blades as defined in the precharacterizing clause of claim 1.

Such a machine is known from the brochure "VOLLMER CHD—Die Automaten zum Schleifen der kompletten Zahngeometrie hartmetallbestückter Kreissageblätter in einer Einstellung", published by the applicant in October 1995. Although that machine is intended specifically for grinding the teeth of circular saw blades, machines characterized by the features recited in the preamble of claim 1 in principle are suited also for machining saw blades of band saws and gang saws as well as milling cutters and the like. Moreover, the work also may be carried out by way of electric discharge machining, using one or more rotating spark erosion discs. Accordingly, the instant invention is not limited to the grinding of teeth of circular saw blades.

Regardless of the general configuration and purpose of the workpieces to be machined, their cutting teeth normally are so hard that the rotationally symmetric tool used which is adapted to be driven in rotation, whether it be one or more grinding or erosion discs, may suffer so much wear, possibly by machining no more than one workpiece or but a single tooth, that dimensional variations of the tool must be taken into account in the further processing of the workpiece. To accomplish that, the tool so far must be subjected to time-consuming measurements. Usually a certain starting dimension of the workpiece also must be determined to allow for the proper positioning of the workpiece to be machined. With circular saws, for example, their diameter must be measured prior to machining. Finally, it must be kept in mind with machines of the kind in question that the advance finger belonging to the advance means gradually becomes flattened by its intermittent action on one each of the cutting teeth so that corrective measures are required to make sure that all the cutting teeth at least of one and the same workpiece are pushed by the advance finger precisely into the desired position for machining. The desired machining position of a machine of the kind in question normally is the position at which the tip of the cutting tooth to be machined lies on the axis defined as pivot axis. In general, and in the present case, too, the tip of the tooth is understood to be a sharp edge formed by a tooth face and the back of the tooth, also called tooth flank.

It is the object of the invention to make it possible for the measuring and correcting procedures described to be carried out automatically.

The object is met, in accordance with the invention, by the features defined in claim 1. Advantageous further developments may be gathered from the dependent claims.

Figure 2:
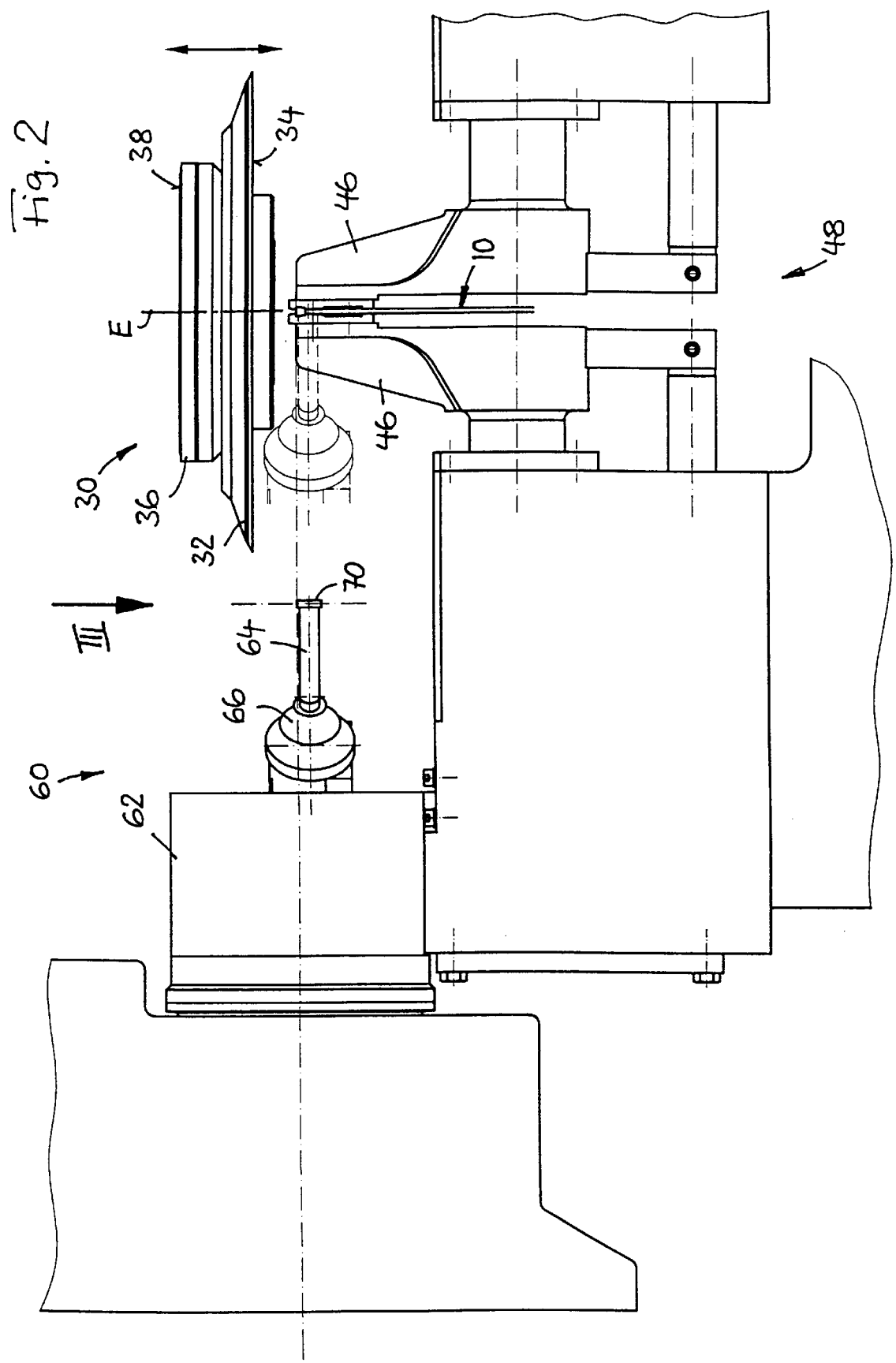
Figure 3:
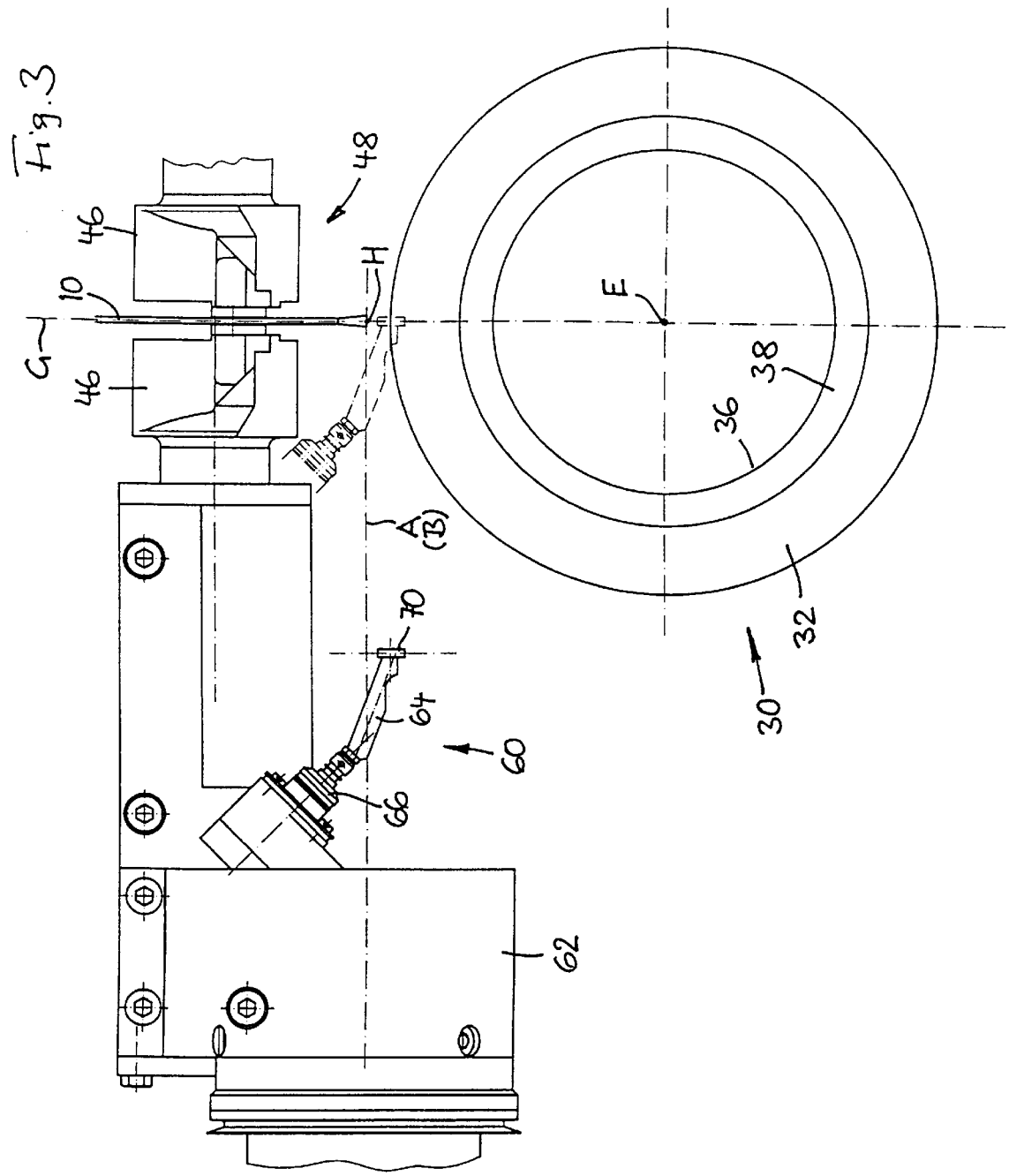
Figure 4:
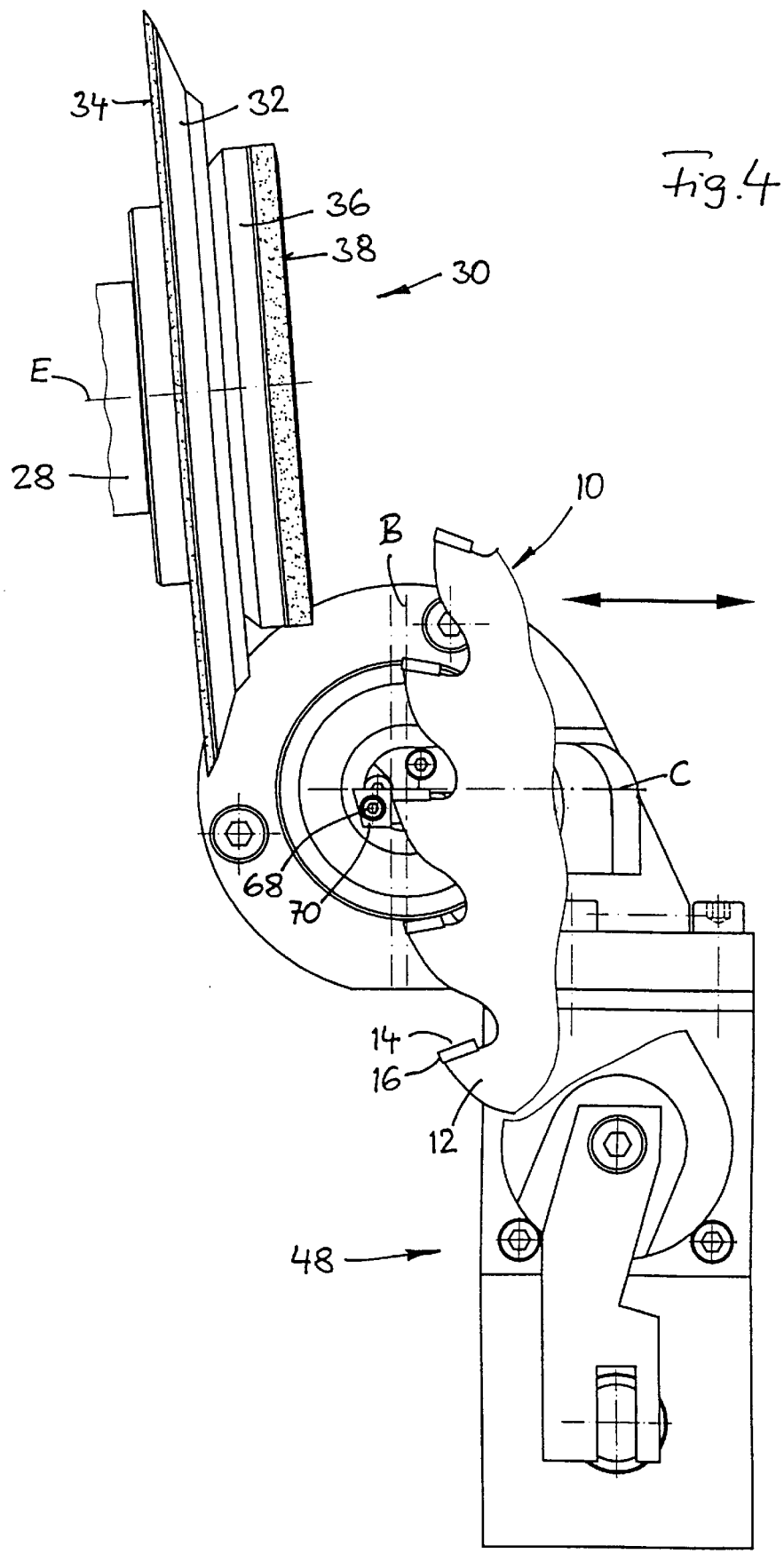
Figure 7:
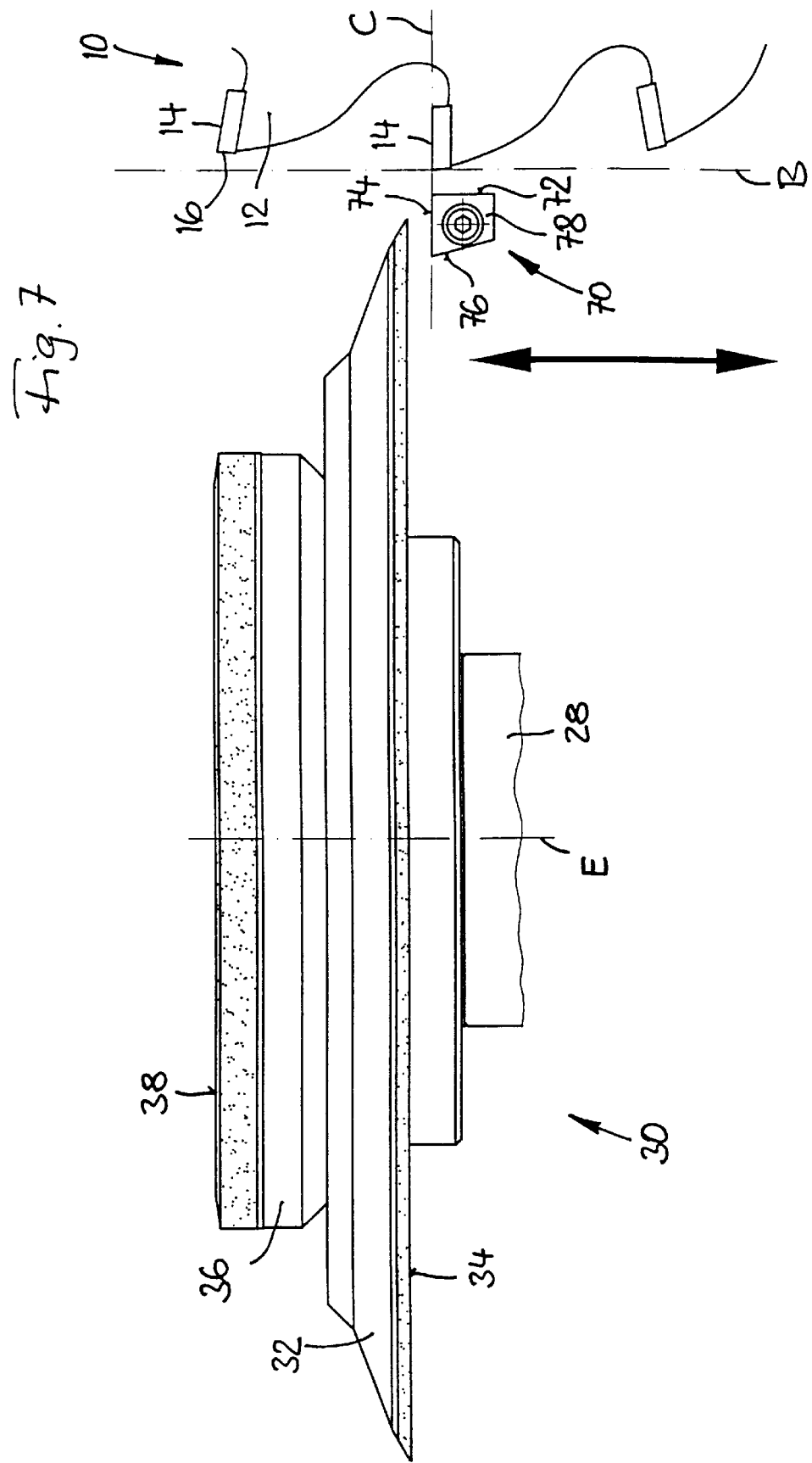
Figure 8:
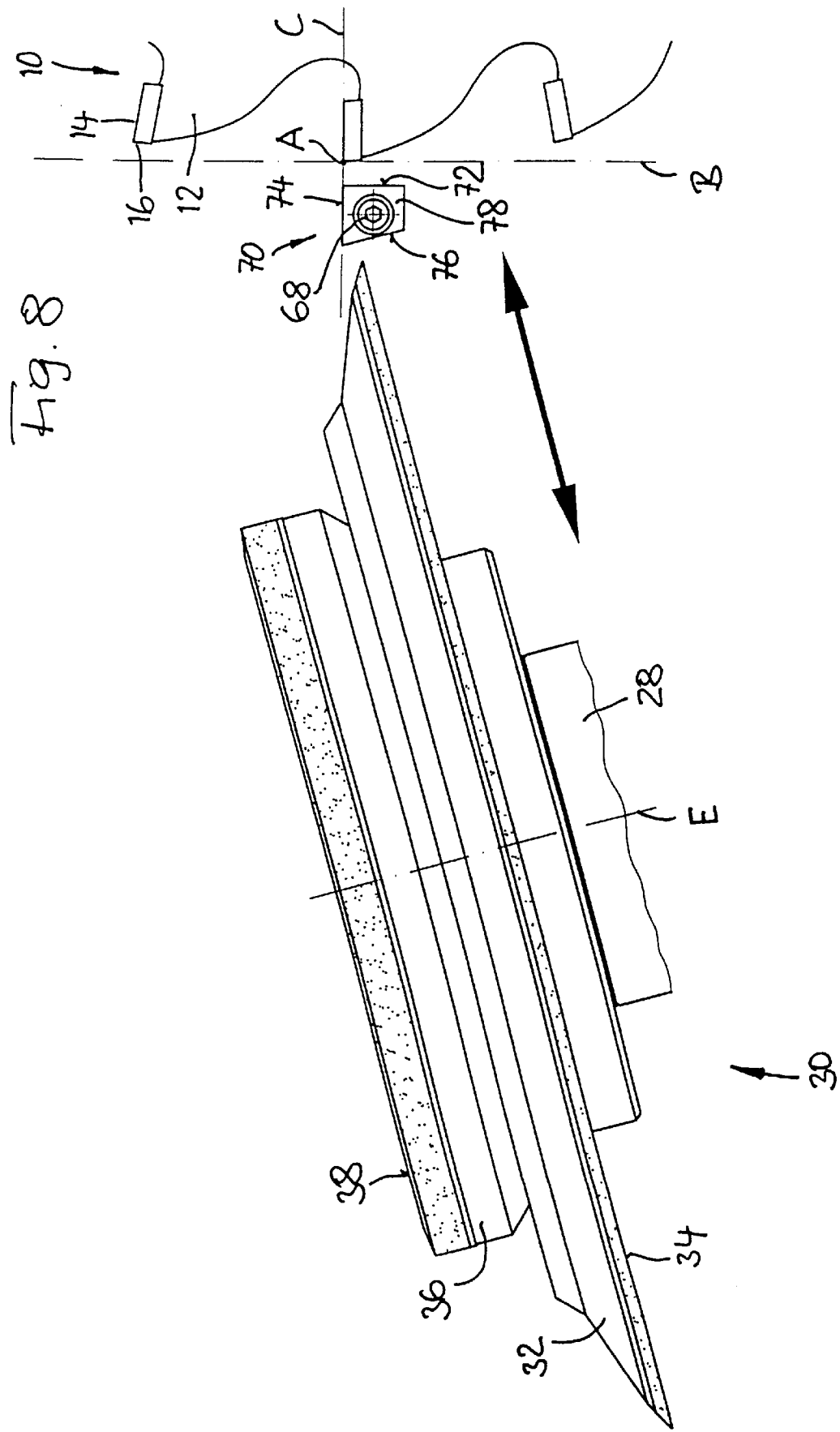
Figure 9:
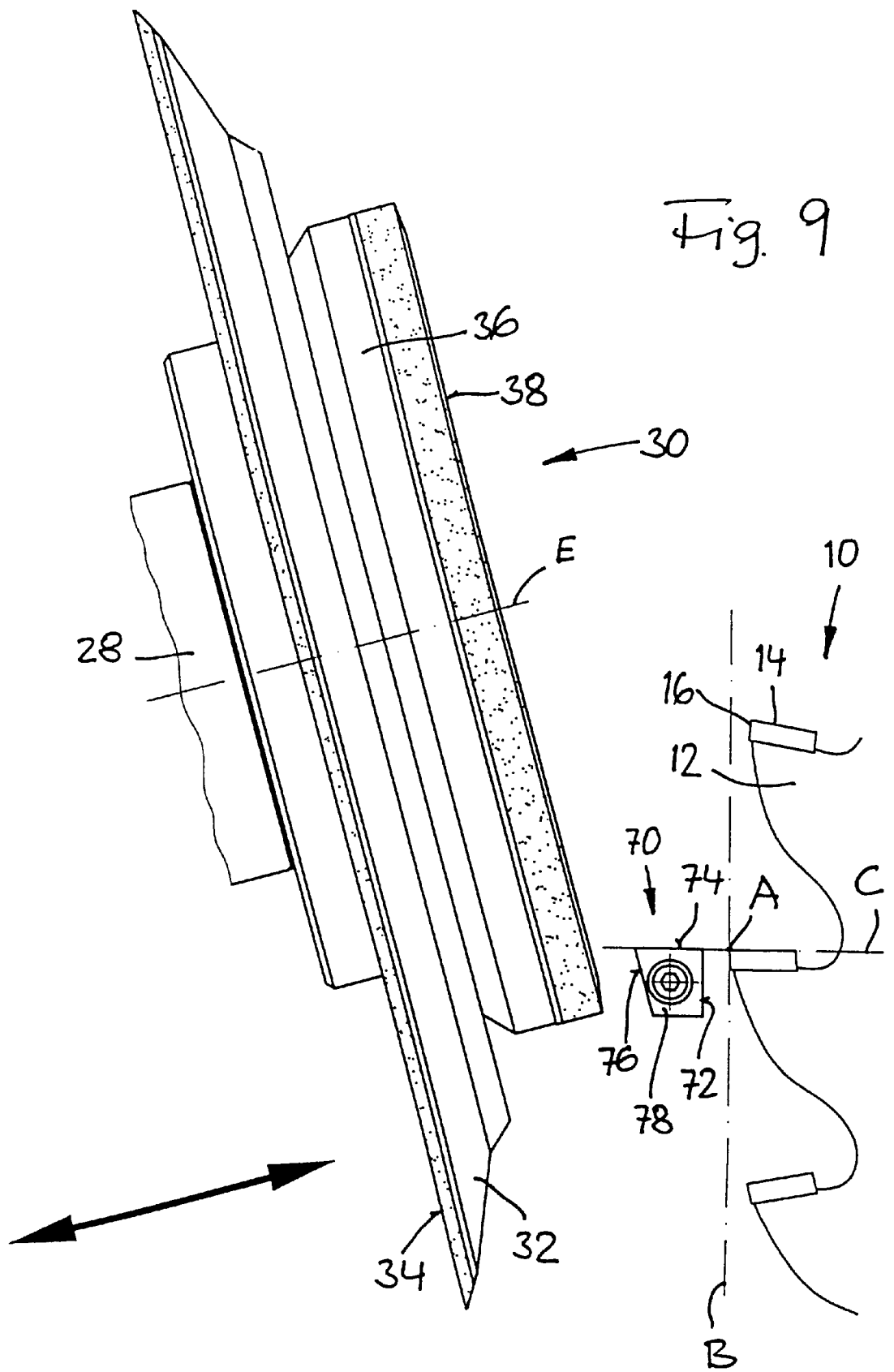
Figure 10:
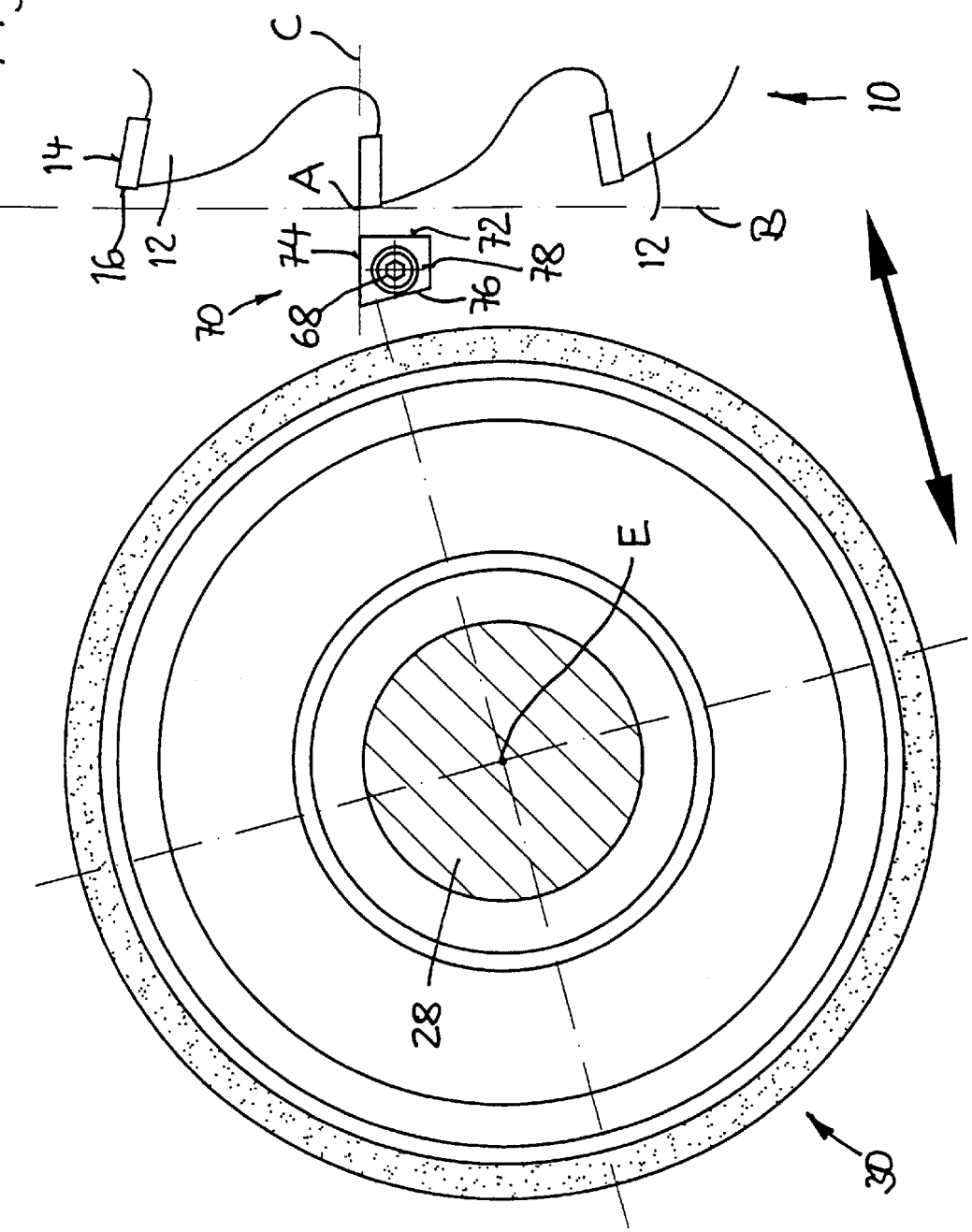
Figure 11:
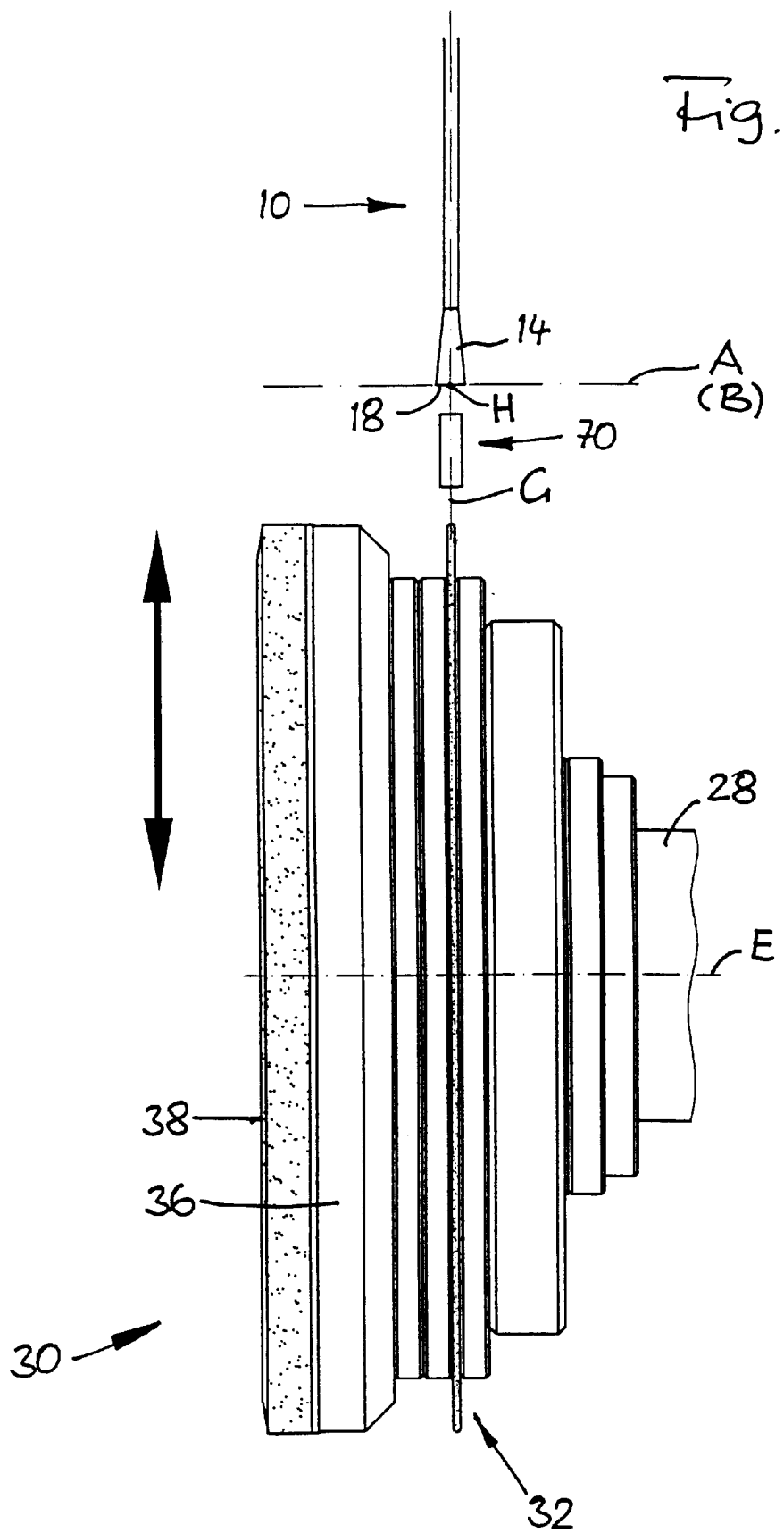

An embodiment of the invention will be described in greater detail below with reference to diagrammatic drawings, in which:

FIG. 1 shows the machine according to the invention, as seen from the front,

FIG. 2 is an enlarged part sectional elevation in the direction of arrow II in FIG. 1, FIG. 3 is the corresponding top plan view according to arrow III in FIG. 2, FIG. 4 shows an enlarged cutout of FIG. 1 at a first phase of an operating cycle of the machine, FIGS. 5 to 10 show corresponding cutouts at further phases of an operating cycle, FIG. 11 shows an enlarged cutout of FIG. 3, but with modified tool equipment of the machine, and FIG. 12 is a cutout similar to FIG. 7, but with further modified tool equipment of the machine.

The example shown of a workpiece 10 to be machined on the machine illustrated is a circular saw comprising hard metal trimmed cutting teeth 12, each of which is to be machined at its tooth face 14 and tooth flank 16 while its tooth tip 18 remains precisely in a predetermined position.

The machine shown comprises a machine bed 20 on which an elongate pivot body 22 is supported for swinging adjustment about a pivot axis A which is horizontal in the embodiment illustrated. The pivot axis A is defined as the line of intersection of a vertical first reference plane B and a horizontal second reference plane C. A lift axis D extends along the pivot body 22, intersecting the pivot axis A at a right angle and presenting the axis of movement of a reciprocating slide 24. The reciprocating slide is mounted on the pivot body 22 for reciprocating movement along the lift axis D and is adjustable by swinging about the lift axis D. A saddle 26 is guided on the reciprocating slide 24 for infeed movement along a spindle axis E which intersects the lift axis D at right angles and extends perpendicularly to the pivot axis A when in the normal position illustrated. The spindle axis E is the axis of a tool spindle 28 supported on the saddle 26 and adapted to be driven in rotation. A tool 30 for machining the workpiece 10 may be fastened to the tool spindle 28.

In the embodiment shown, the tool 30 is a combination of grinding discs composed of a plate-like first grinding disc 32 having a planar, annular, first front face 34 and a cup-shaped second grinding disc 36 likewise having a planar, annular second front face 38. The two grinding discs 32 and 36 are clamped together coaxially with their backs facing each other so that the second front face 38 is remote from the first front face 34. The first grinding disc 32 has a greater diameter than the second grinding disc 36 and it is intended to grind the tooth face 14 of each cutting tooth 12 by its first front face 34. The second grinding disc 36 of smaller diameter is intended to grind the tooth flanks 16 by the second front face 38. The grinding disc combination shown may be replaced by a single grinding disc or an erosion disc or a combination of two erosion discs serving as tool 30. In the event that the cutting teeth 12 to be machined include teeth whose tooth face 14 does not extend parallel to the pivot axis A, as illustrated, the saddle 26 is swung about the lift axis D in accordance with the inclination of the tooth face 14 to be machined.

A guide means 40 which is horizontal in the embodiment shown is disposed at the front of the machine bed 20 and so as to extend at right angles to the pivot axis A. A workpiece slide 42 carrying a workpiece support 44 is adapted to traverse along the guide means 40. In the embodiment shown which includes a circular saw as workpiece 10, the workpiece support 44 comprises a peg defining an axis of rotation F for the workpiece 10 in parallel with the pivot axis A. The workpiece 10 is centered on this peg. The workpiece slide 42 is adjusted in such manner that the circular line around the axis of rotation F on which lie all the tooth tips 18 of the workpiece 10 intersects the pivot axis A. Consequently the workpiece 10 can be rotated in steps into machining positions such that one tooth tip 18 each will be located on the pivot axis A. The central plane G of the workpiece 10 extending perpendicularly to the axis of rotation F, in other words vertically in the embodiment shown is arranged such that it contains the lift axis D. In this position the workpiece 10 is clamped between two jaws 46 of a clamping means. The tooth tip 18 of the cutting tooth 12 to be machined is located at a point H at which the pivot axis A passes through the central plane G.

To effect the stepwise advancing motion of the workpiece 10, being a rotational movement in the embodiment illustrated, the machine shown comprises an advance means 50 including a rod 52 which is adapted to be extended along a feed axis I under CNC control and which carries an advance head 54 at its end. At the advance head 54, a cross slide 56 carrying an advance finger 58 is guided for displacement parallel to the pivot axis A. The cross slide 56 normally is in inoperative position, with the advance finger 58 remote from the central plane G. It is only when a movement to advance the workpiece is to be carried out that the cross slide 56 is shifted, parallel to the pivot axis A, into a position at which the advance finger 58 enters into the tooth gap in front of the next cutting tooth 12 to be machined and, by extending the rod 52, presses against the tooth face 14 of this tooth to push it into the position described at which the tooth tip 18 coincides with point H. It should be noted that the feed axis I can only be approximated to the path of movement of the tooth face 14 which is pushed forward by the advance finger 58. Therefore, relative movement takes place between the tooth face 14 and the advance finger 58, and the advance finger 58 becomes worn due to the relative movement. If not compensated, this wear will cause the tooth tip 18 not quite to reach point H and, as a result thereof, the tooth face 14 and the tooth flank 16 cannot be ground with the desirable accuracy.

The machine thus far described is of known structure corresponding, for instance, to the applicant's brochure mentioned initially. That includes the fact that the machine comprises known numerical control facilities (not shown) by which all the movements mentioned can be controlled according to a program.

The most important data of the workpiece 10, the tool 30, and the advance means 50 which are required to obtain the desired geometry of the cutting teeth 12 can be determined, for the machine shown, by a measuring means 60 which is connected to the control means mentioned above. The measuring means 60 comprises a measuring slide 62 which is movable from its position of rest, shown in continuous lines in FIG. 3, into the measuring position indicated by dash-dot-lines. The measuring slide 62 supports a measuring body 64 by means of a joint 66 of the universal joint type so that the measuring body can be deflected in pendulating fashion in all directions while, at the same time, supplying signals to the control means to indicate the direction of deflection . A feeler 70 is attached to the end of the measuring body 64 by a simple fastener, for example a hexagon socket screw as shown, so that it can be exchanged easily and yet is fixed in a precisely reproducible position with respect to the measuring body 64.

The feeler 70 consists of particularly hard material, being made for instance of hard metal or polycrystalline diamond, so that it is not prone to wear. It may be replaced by a trimming tool for commercially available erosion discs where such discs are used as tool 30. The feeler 70 is formed with four sensing surfaces, a first sensing surface 72 slightly spaced from and parallel to the first reference plane B and, therefore, oriented vertically, a second sensing surface 74 which lies in the second reference plane C and, therefore, forms a right angle with the first sensing surface 72, a third sensing surface 76 which forms an angle of 75° with the second sensing surface 74 in the embodiment illustrated and extends parallel to the pivot axis A, as do the first and second sensing surfaces, and a fourth sensing surface 78 presenting a free end surface of the feeler 70 and extending vertically with respect to the pivot axis A and thus also at right angles to the first to third sensing surfaces.

Several possibilities of how to use the measuring means 60 will be described below:

In many cases one cannot start from the assumption that all the relevant data of the workpiece 10 to be machined are known to begin with. If, for example, the workpiece 10 is a circular saw, as illustrated, and if it is a used one that has been resharpened at least once, the diameter thereof must be measured before it can be resharpened once more with the desired degree of accuracy on the machine shown. To that end, the workpiece 10 is donned on the workpiece support 40 while the workpiece slide 42 is in its end position remote from the pivot axis A. Then the workpiece slide 42 is moved forward under numerical control along its guide means 40 until the tooth tip 18 has reached the vicinity of point H. Thereupon the advance means 50 is actuated once, its advance finger 58 thus pushing the tooth face 14 which originates at this particular tooth tip 18 into a position at which this tooth tip lies more or less precisely in the horizontal second reference plane C. This procedure of preliminary positioning may be dispensed with if corresponding prepositioning has been obtained in a different manner, such as by manually putting the tooth face 14 in question into contact with a stop or by using a robot which delivers the prepositioned workpiece 10 to the machine illustrated.

Subsequently the measuring slide 62 is extended so that the feeler 70 will adopt its measuring position in the central plane G and, following that, the workpiece slide 42 is continued to be advanced at creeping speed until the tooth tip 14 abuts against the vertical first sensing surface 72 of the feeler 70. As soon as that has happened the measuring means 60 emits a signal based on which the control means is enabled to calculate the diameter of the saw blade used as workpiece 10 in the embodiment shown. It can do so because it knows the position of the workpiece slide 42 and thus also that of the pivot axis F. Given suitable standardization, knowing the diameter makes it possible in many cases to draw unambiguous conclusions as to further data of the workpiece 10, for instance its tooth pitch. The measuring slide 62 then returns to the inoperative position.

For final positioning of the workpiece 10, the workpiece slide 42 finally is retracted by a distance which corresponds to the previously known spacing of the first sensing surface 72 of the non-deflected feeler 70 from the vertical first reference plane B. The tooth face 14 of the first cutting tooth 12 to be machined then stands at point H on the pivot axis A. As this position is reached, the clamping means 48 is closed so that the workpiece 10 no longer can move unintentionally. Having thus been positioned, the cutting tooth 12 now is ground by the tool 30, for example, first at the tooth face 14 by the first front face 34 and later on by the second front face 38 at the tooth flank 16.

Figure 5:
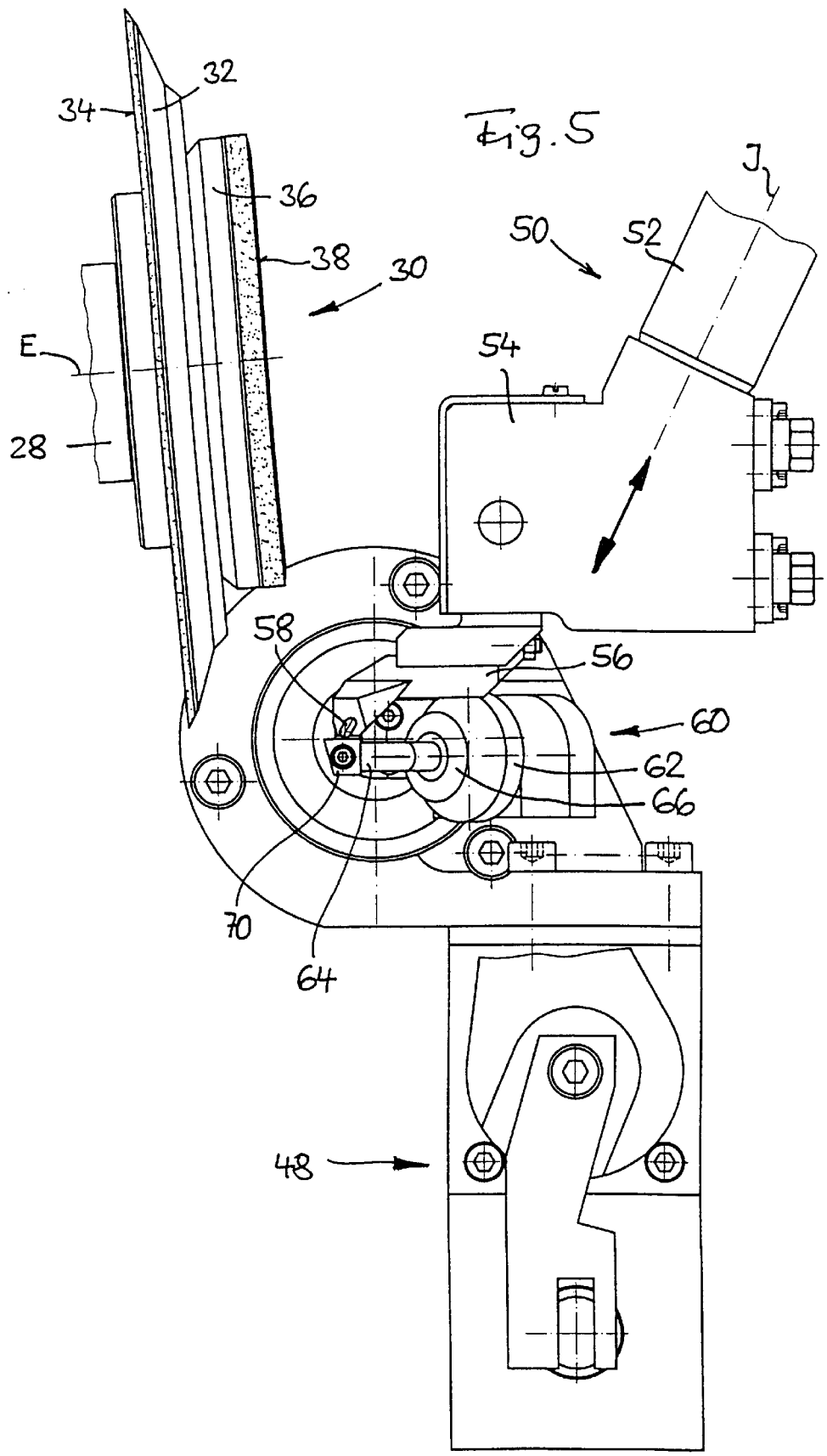
Figure 6:
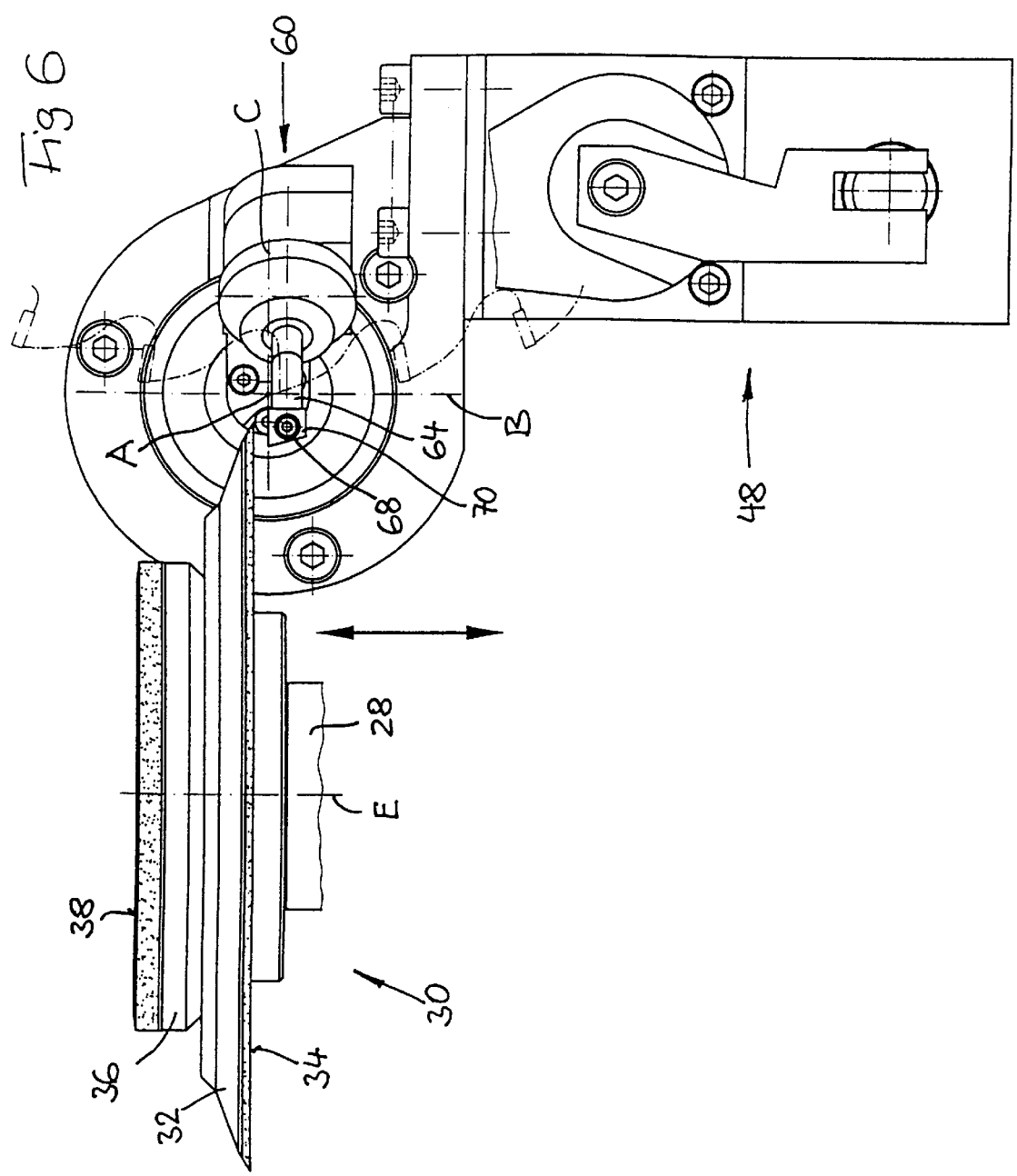

When it is to be assumed, after having machined a more or less great number of cutting teeth 12, that the advance finger 58 has suffered wear which might begin to affect the precision of positioning the individual cutting teeth 12, the time has come to measure the advance means 50 again. Following the machining of a predetermined number of cutting teeth 12, therefore, the measuring slide 62 automatically is shifted into measuring position and the advance means 50 is extended so that, as seen in FIG. 5, the advance finger 58 touches the horizontal second sensing surface 74 of the feeler 70 and the measuring means 60 thus emits a signal to the control means. The latter thereupon causes the position of the advance means 50 to be corrected and, thereby, the wear is compensated which had occurred at the advance finger 58. Following that, the measuring slide 62 returns to the inoperative position and machining of the work-piece 10 may be continued.

Alterations occurring at the tool 30 due to wear are measured and compensated at given intervals, too. Regarding the first front face 34 this is accomplished, as may be gathered from FIGS. 6 and 7, by moving the reciprocating slide 24 under program control into a pivot position at which the front face 34 is oriented horizontally, in other words parallel to the second sensing surface 74 of the feeler 70. Then the tool slide 26 is infed until the first front face 34 of the tool 30 contacts the second sensing surface 74 of the feeler 70, whereby a signal is released from the measuring means 60 to cause the required correction to be made of the position of the tool slide 26 for grinding the next tooth face 14.

In view of the fact that also the effective diameter of the plate-like grinding disc 32 is reduced by wear, this diameter, too, may be measured automatically at predetermined intervals. To this end, the pivot body 22 is moved into a position at which the first front face 34 of the tool 30 extends perpendicularly with respect to the third sensing surface 76 of the feeler. Then the tool spindle 28 is infed transversely of the spindle axis E, as indicated by the double arrow in FIG. 8, by means of a transverse slide associated in conventional manner with the tool slide 26, until the outer edge of the first grinding disc 32 touches the third sensing surface 76 of the feeler 70, whereby again a correction signal is released.

As indicated in FIGS. 9 and 10, the position of the second front face 38 and the diameter of the second grinding disc 36, respectively, can be determined and corresponding corrections made in analog fashion.

Apart from an identical second cup-shaped grinding disc 36 the tool 30 according to FIG. 11 comprises a smaller, thin first grinding disc 32 which serves to open a chip breaking groove in each cutting tooth 12, starting from the tooth flank 16 and being situated in the central plane G. The diameter of this modified first grinding disc 32 wanes rather quickly due to wear and, therefore, must be measured at appropriate predetermined short intervals. That is accomplished according to FIG. 11 and again followed by corresponding compensation.

Finally, there are cutting teeth 12 whose tooth face 14 is subjected to concave grinding. That is achieved, as illustrated in FIG. 12, by means of a modified tool 30 which may be embodied by a roller shaped abrasive tool of very small diameter. Also this tool is subjected to measurements at predetermined intervals, as a prerequisite for adequate positional corrections to be made. As shown in FIG. 12, that is done by bringing the peripheral surface of the tool 30 into contact with the second sensing surface 74 of the feeler 70, whereby a corresponding signal for correction is released.

What is claimed is:

1. A machine for machining workpieces (10) which have cutting teeth (12), especially saw blades, comprising
   a machine bed (20) on which a pivot axis (A) is fixed, first and second reference planes (B, C) intersecting on said pivot axis,
   a pivot body (22) which is adapted to swing about the pivot axis (A) and defines a lift axis (D) extending transversely of the pivot axis,
   a reciprocating slide (24) which is guided on the pivot body (22) for reciprocating along the lift axis (D),
   a saddle (26) which defines a spindle axis (E) extending transversely of the lift axis (D) and is guided on the reciprocating slide (24) for infeeding motion,
   a tool spindle (28) which is supported on the saddle (26) so as to be driven in rotation about the spindle axis (E) and is adapted to receive a rotationally symmetric tool (30),
   a workpiece slide (42) which is guided on the machine bed (20) for traversing transversely of the first reference plane (B) and which defines a central plane (G), at right angles to the pivot axis (A), together with a workpiece support (44) formed integrally with the workpiece slide (42),
   an advance means (50) including an advance finger (58) adapted for intermittent engagement with a respective cutting tooth (12) of a workpiece (10) retained on the workpiece support (44) SO as to advance the same, and
   a means for control of movements of the saddle (26), the workpiece slide (42), and the advance finger (58), characterized in that
   a common feeler (70) is provided to determine the distance of the cutting teeth (12) of the workpiece (10) from the workpiece support (44) and also to determine at least one measurable variable which reflects the condition of wear of the tool (30) or of the advance finger (58), said feeler (70) being movable from a retracted, inactive position into a measuring position in the vicinity of point (H) at which the pivot axis (A) passes through the central plane (G), and
   the control means is designed to convert the measured data into signals for controlling the workpiece slide (42) and the saddle (26) and/or the advance means (50).

2. The machine as claimed in claim 1, characterized in that the feeler (70) has first and second sensing surfaces (72, 74) which are parallel to the first and second reference planes (B and C, respectively), the first sensing surface (72) serving to measure the distance of the cutting teeth (12) from the workpiece support (44), while the second sensing surface (74) serves to measure a thickness dimension of the advance finger (58) and/or the tool (30).

3. The machine as claimed in claim 2, characterized in that the first and second sensing surfaces (72, 74) together form a right angle.

4. The machine as claimed in claim 2, characterized in that the feeler (70) has a third sensing surface (76) which forms an acute angle with the second sensing surface (74) and serves to measure another thickness dimension and/or at least a radius of the tool (30).

5. The machine as claimed in claim 4, characterized in that the feeler (70) has a fourth sensing surface (78) at right angles with respect to the first to the third sensing surfaces (72, 74, 76).

6. The machine as claimed in claim 3, characterized in that the feeler (70) has a third sensing surface (76) which forms an acute angle with the second sensing surface (74) and serves to measure another thickness dimension and/or at least a radius of the tool (30).

7. The machine as claimed in claims 1 to 5 or 6, characterized in that the feeler (70) is designed also for adjusting the tool (30).

* * * * *